(12) United States Patent
Phegade et al.

(10) Patent No.: US 9,118,639 B2
(45) Date of Patent: Aug. 25, 2015

(54) TRUSTED DATA PROCESSING IN THE PUBLIC CLOUD

(71) Applicant: Intel Corporation, Santa Clara, CA (US)

(72) Inventors: Vinay Phegade, Beaverton, OR (US); Nilesh K Jain, Beaverton, OR (US); Jesse Walker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/994,451

(22) PCT Filed: Mar. 14, 2013

(86) PCT No.: PCT/US2013/031144
§ 371 (c)(1),
(2) Date: Jun. 14, 2013

(87) PCT Pub. No.: WO2014/142858
PCT Pub. Date: Sep. 18, 2014

(65) Prior Publication Data
US 2014/0281531 A1    Sep. 18, 2014

(51) Int. Cl.
*H04L 9/08*     (2006.01)
*H04L 29/06*    (2006.01)
*G06F 9/455*    (2006.01)

(52) U.S. Cl.
CPC ............ *H04L 63/06* (2013.01); *G06F 9/45558* (2013.01); *H04L 9/083* (2013.01); *H04L 9/0825* (2013.01); *H04L 9/0827* (2013.01); *G06F 2009/45587* (2013.01)

(58) Field of Classification Search
CPC ... H04L 63/06; H04L 63/062; H04L 63/0428; H04L 63/12; H04L 63/126
See application file for complete search history.

(56) References Cited

U.S. PATENT DOCUMENTS

| | | | |
|---|---|---|---|
| 8,245,037 B1* | 8/2012 | Durgin et al. | 713/167 |
| 8,566,578 B1* | 10/2013 | Banerjee | 713/153 |
| 2008/0083036 A1* | 4/2008 | Ozzie et al. | 726/27 |
| 2010/0211781 A1 | 8/2010 | Auradkar et al. | |

(Continued)

OTHER PUBLICATIONS

International Search Report and Written Opinion received for PCT Patent Application No. PCT/US2013/031144 mailed on Dec. 10, 2013, 11 pages.

*Primary Examiner* — Gilberto Barron, Jr.
*Assistant Examiner* — Vance Little
(74) *Attorney, Agent, or Firm* — Grossman, Tucker, Perreault & Pfleger, PLLC

(57) ABSTRACT

Generally, this disclosure describes a system and method for trusted data processing in the public cloud. A system may include a cloud server including a trusted execution environment, the cloud server one of a plurality of cloud servers, a cloud storage device coupled to the cloud server, and a RKM server including a key server module, the RKM server configured to sign the key server module using a private key and a gateway server configured to provide the signed key server module to the cloud server, the trusted execution environment configured to verify the key server module using a public key related to the private key and to launch the key server module, the key server module configured to establish a secure communication channel between the gateway server and the key server module, and the gateway server configured to provide a cryptographic key to the key server module via the secure communication channel.

20 Claims, 7 Drawing Sheets

(56) References Cited

U.S. PATENT DOCUMENTS

| | | |
|---|---|---|
| 2011/0264906 A1 | 10/2011 | Pourzandi et al. |
| 2012/0159178 A1 | 6/2012 | Lin et al. |
| 2012/0265976 A1 | 10/2012 | Spiers et al. |
| 2012/0297183 A1* | 11/2012 | Mukkara et al. .............. 713/153 |
| 2012/0328105 A1 | 12/2012 | Mukkara et al. |

* cited by examiner

TRUSTED DATA PROCESSING IN THE PUBLIC CLOUD

FIELD

This disclosure relates to data processing, more particularly trusted data processing in the public cloud.

BACKGROUND

Reducing cost and increasing efficiency are primary motivations for utilizing a public cloud for data storage and processing. However, data stored in the cloud may be vulnerable to other clients of the cloud as well as to the cloud provider themselves. In particular, data security, unauthorized data disclosure due to insider access to the infrastructure and a shared multi-tenant environment all contribute to such vulnerability. Rather than a physical separation of resources, there is a greater dependence on logical separation for providing security.

Encryption is one technique for achieving logical separation of client data from other clients. However, key management can be difficult to achieve due to a need to protect a master (root) key as well as backup, disaster and recovery. Further, for many systems and, e.g., regulatory compliance, mechanisms for achieving dependable auditing may be required. Loss of control of data may complicate achieving such compliance.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure describes a system and method configured to facilitate secure data processing in the public cloud. As used herein, "cloud" means a plurality of interconnected cloud servers and cloud storage devices that may be shared by a plurality of clients that are configured to provide data storage and processing functionality to the plurality of clients (cloud customers). The system and method are configured to encrypt data prior to uploading to the cloud, decrypt and process the data only in trusted and/or secure environments and to encrypt a result of the processing prior to transferring the result from the trusted environment. The system and method are further configured to retain key management function(s) by a client system configured to provide a key server module to the cloud. The key server module is configured to be executed in a trusted environment, to attest to the client system and to provide cryptographic keys to the data processing modules via secure channels established for this purpose. The data processing modules are configured to attest to the key server prior to the establishment of the secure channels. The cryptographic keys may be provided to the key server module by a root key management (RKM) server included in the client system. The client system may further include a gateway server configured to provide a network interface between the client system, other networks and/or the cloud, as described herein. The RKM server is configured to maintain root key(s) in local secure storage and to provide cryptographic key(s) to the key server module via the gateway server and a secure channel. In some embodiments, the RKM server may be included in the gateway server. In some embodiments, the RKM server may be separate from and coupled to the gateway server. The key server module may then store the cryptographic keys sealed to its identity in secure storage. Thus, access to client data by other users of the cloud service and/or the cloud service providers themselves may thus be prevented. Key management functions may thus be retained by a root key management server included in a client system facilitating control of data and keys as well as auditing.

Figure 1:
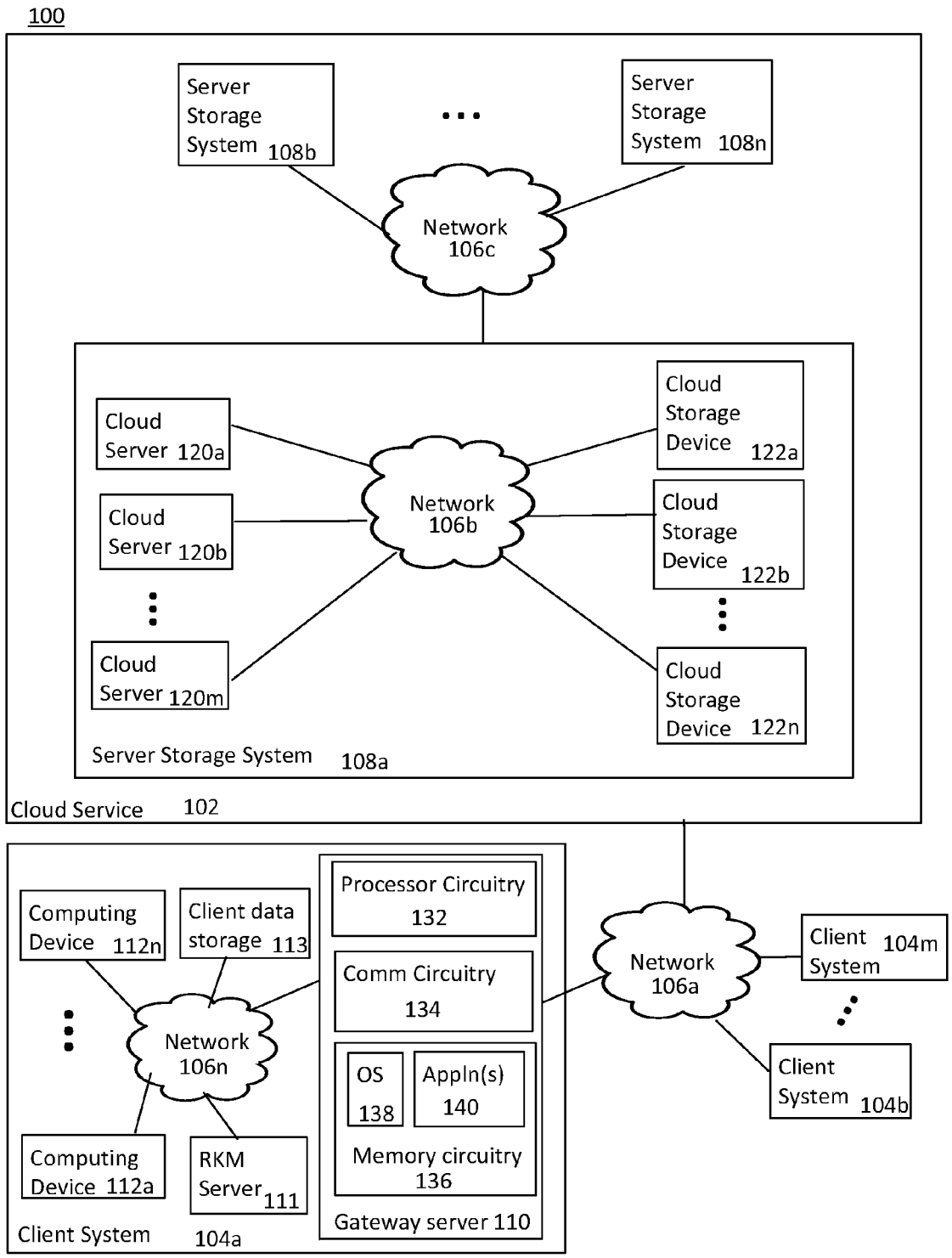
FIG. 1 illustrates a system including a cloud service and a client system consistent with various embodiments of the present disclosure.

FIG. 1 illustrates a system 100 that includes a cloud service 102 that may include one or more server storage system(s) 108a, . . . , 108n and one or more client systems 104a, . . . , 104m consistent with various embodiments of the present disclosure. Client system 104a may include a gateway server 110, a root key management ("RKM") server 111, client data storage 113 (e.g., network attached storage) and one or more computing device(s) 112a, . . . , 112n. The server storage system 108a may include one or more cloud server(s) 120a, . . . , 120m and one or more cloud storage device(s) 122a, . . . , 122n. The server storage system(s) 108a, . . . , 108n, client systems 104a, . . . , 104m, gateway server 110, computing device(s) 112a, . . . , 112n, cloud server(s) 120a, . . . , 120m and cloud storage device(s) 122a, . . . , 122n may be coupled by a plurality of networks 106a, . . . , 106n.

Computing devices 112a, . . . , 112n may include, but are not limited to, desktop computers, laptop computers, tablet computers (e.g., iPad®, GalaxyTab® and the like), ultraportable computers, ultramobile computers, netbook computers, subnotebook computers, mobile telephones, smart phones, (e.g., iPhones®, Android®-based phones, Blackberries®, Symbian®-based phones, Palm®-based phones, etc.), feature phones, personal digital assistants, enterprise digital assistants, mobile internet devices, personal navigation devices, etc. Computing devices 112a, . . . , 112n may be configured to upload data from, e.g., client data storage 113, to server storage system 108a for storage in one or more cloud storage device(s) 122a, . . . , 122n that may then be processed by one or more cloud server(s) 120a, . . . , 120m as described herein. The RKM server 111 is configured to manage encrypting the data prior to uploading and to perform operations associated with key management, as described herein.

Gateway server 110 is configured to manage communication between client system 104a and cloud service 102, network 106a and/or other client system(s) 104b, ..., 104m. Gateway server 110 is configured to provide proxy server functions (i.e., is configured to act as an intermediary) for RKM server 111 and/or computing device(s) 112a, ..., 112m and cloud service 102. Gateway server 110 may include processor circuitry 132, communication circuitry 134 and memory circuitry 136 including operating system OS 138, one or more application(s) 140. Processor circuitry 132 may include one or more processors configured to perform operations associated with gateway server 110. Communication circuitry 134 is configured to communicate, wired and/or wirelessly, with computing devices 112a, ..., 112n, RKM server 111 and/or client data storage 113 via network 106n and/or cloud service 102 via network 106a, using one or more communication protocols, as described herein. The communication protocols may include, but are not limited to, Wi-Fi, 3G, 4G, Ethernet and/or some other communication protocol.

For example, a user via computing device 112a may request cloud processing of data stored in client data storage 113. RKM server 111 is configured to provide cryptographic keys for encrypting the data prior to uploading the encrypted data to cloud service 102. Gateway server 110 may then be configured to upload the encrypted data to cloud service 102 for storage in, e.g., one or more of cloud storage device(s) 122a, ..., 122n. A key server module, configured to perform key management functions as described herein, may be uploaded from RKM server 111 to cloud service 102 via gateway server 110. The key server module may be uploaded prior to the data, with the data or after the data. The key server module may be executing in the cloud as a service. One or more data processing module(s) may be uploaded via gateway server 110 configured to perform data processing operations on the uploaded data, as described herein. Results of the data processing operation may then be received from cloud service 102 via gateway server 110 and provided to the requesting computing device.

Figure 2:
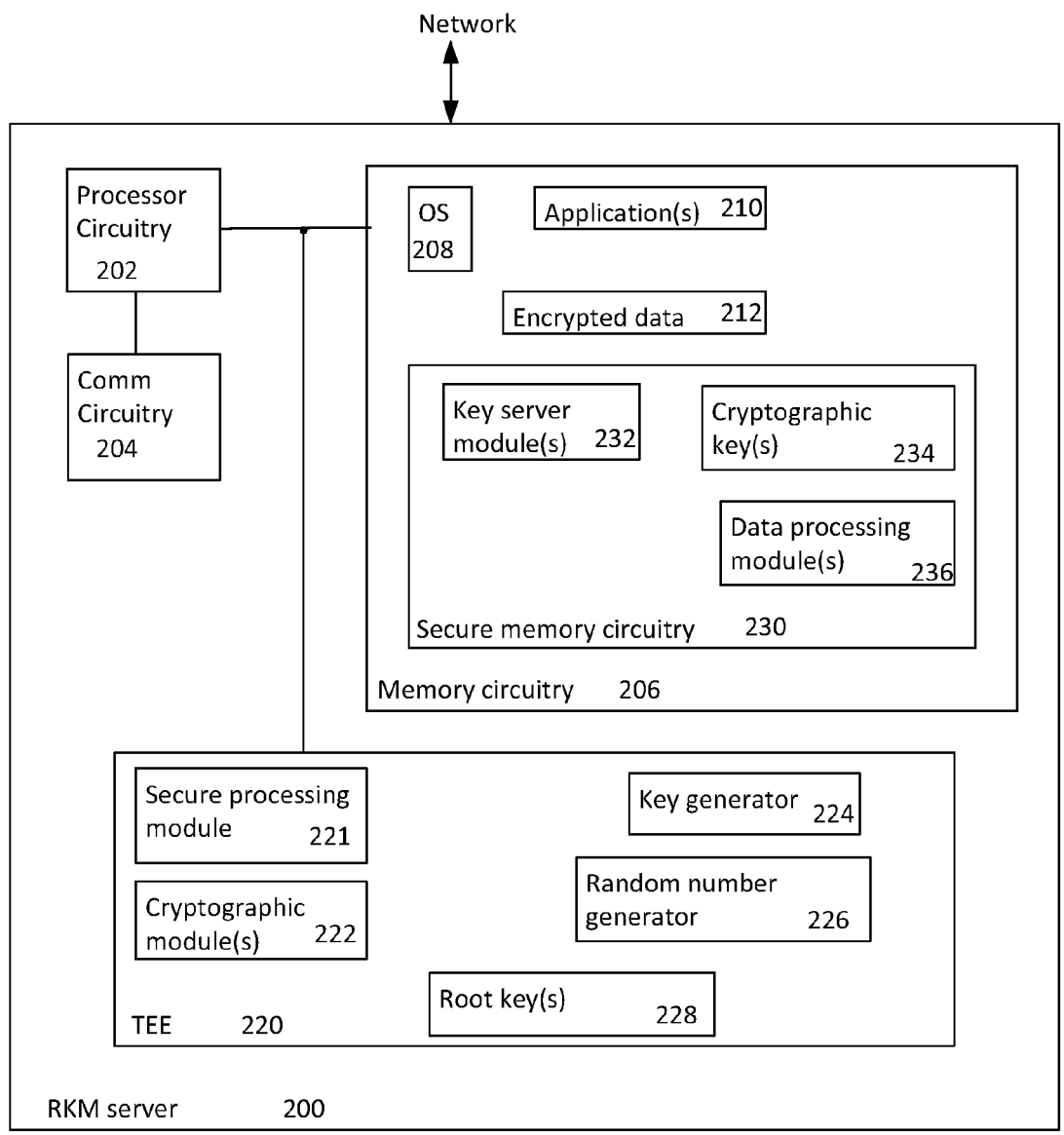
FIG. 2 illustrates an example root key management (RKM) server consistent with various embodiments of the present disclosure.

FIG. 2 illustrates an example RKM server 200 consistent with various embodiments of the present disclosure. RKM server 200 corresponds to RKM server 111 of FIG. 1. RKM server 200 may include processor circuitry 202, communication circuitry 204 and memory circuitry 206 including operating system OS 208, one or more application(s) 210, encrypted data 212 and/or unencrypted data 214. Processor circuitry 202 may include one or more processors configured to perform operations associated with RKM server 200. Communication circuitry 204 is configured to communicate, wired and/or wirelessly, with computing devices 112a, ..., 112n via network 106n and/or cloud service 102 via network 106a, using one or more communication protocols, as described herein. The communication protocols may include, but are not limited to, Wi-Fi, 3G, 4G, Ethernet and/or some other communication protocol.

RKM server 200 may include a trusted execution environment TEE 220 and secure memory circuitry 230. Trusted execution environment 220 is configured to provide a trusted execution and storage environment, e.g., may comply with a Trusted Platform Module (TPM) protocol, as described herein. TEE 220 may come in various forms or be provided by various technologies, such as Trusted Execution Technology ("TXT") by the Intel Corporation of Santa Clara, Calif., Manageability Engine ("ME"), the TrustZone Security System by ARM Holdings in Cambridge, United Kingdom, Virtualization Technology ("VT-x"), or microcode enforced thread and memory access isolation. Access to data stored in secure memory circuitry 230 may be limited through, for example, cryptographic techniques. In some embodiments, secure memory circuitry may be included in TEE 220.

TEE 220 may include secure processing module 221, one or more cryptographic module(s) 222, a key generator 224, a random number generator 226 and one or more root key(s) 228. The secure processing module 221 is configured to manage operations associated with remote data processing in the cloud. The key generator 224 may be configured to generate cryptographic keys to be utilized by, e.g., data processing module(s) 236 when decrypting data and encrypting results in the cloud. The root key(s) 228 may be utilized for generating one or more certificates, e.g., to certify a RKM server public key, as described herein. In some embodiments the keys may be asymmetric with a key pair including a public key and a private key. In some embodiments the keys may be symmetric secret keys. The keys may be generated using known cryptographic key generation techniques. The random number generator 226 is configured to support cryptographic functions. For example, the random number generator 226 may be configured to provide a seed number for generating a cryptographic key, i.e., a source of entropy.

Secure processing module 221 may be configured to retrieve data from memory circuitry 206 and/or from client data storage 113. Cryptographic module(s) 222 may be configured to encrypt the data and secure processing module 221 may be configured to store the encrypted data 212 in memory circuitry 206 and/or client data storage 113. For example, the data may be encrypted using a randomly generated symmetric key according to the American Encryption Standard (AES). Other known cryptographic techniques may be utilized, consistent with the present disclosure. Gateway server 110 may be configured to receive encrypted processed data from e.g., cloud service 102 and to store the encrypted data in client data storage 113. Secure processing module 221 may then be configured to load the encrypted processed data in memory circuitry 206 for decryption. The decrypted data may then be stored in client data storage 113 for retrieval by one or more of computing device(s) 112a, ..., 112n.

Data may correspond to relatively large blocks of data. As such, encrypting and/or decrypting may be relatively time-consuming. In some embodiments, cryptographic module(s) 222 may be configured to implement Intel® Advanced Encryption Standard New Instructions (Intel® AES-NI), for example, configured to accelerate encryption and decryption, improve key generation and matrix manipulation and facilitate carry-less multiplication. Thus, encrypting and/or decrypting relatively large blocks of data may be performed relatively more quickly using Intel® AES-NI.

Secure memory circuitry 230 is configured to store key server module 232, cryptographic (encryption/decryption) keys 234 and may be configured to store data processing module(s) 236. In some embodiments, data processing module(s) 236 may be stored in memory 206. Key server module 232 is configured to perform key server and key management functions associated with secure data processing using, e.g., cloud service 102. Key server module 232 is configured to be executed in a trusted execution environment in the cloud, as described herein. Cryptographic keys 234 may be utilized to encrypt and/or decrypt data as part of cloud data processing. The cryptographic keys 234 may be generated by cryptographic module 222 and stored in secure memory circuitry 230 prior to being uploaded to the cloud (via a secure channel). Data processing module(s) 236 are configured to be executed in a trusted execution environment and to process data in the trusted execution environment in the cloud.

For example, one or more of the data processing module(s) 236 may be configured to perform map and reduce functions associated with Apache Hadoop, an open-source software framework that supports data-intensive distributed applications, as described herein. One or more of the data processing module(s) 236 may be configured to perform other data processing activities. Data 212 includes encrypted data and may include encrypted data processing result data and/or encrypted data prior to being uploaded to the cloud.

Key server module 232 may be digitally signed and uploaded to cloud service 102. In some embodiments, key server module 232 and other information may be combined and digitally signed prior to upload. The additional information may be configured to identify key server module 232 and/or may include configuration data. Data processing module(s) 236, configured to process data in the cloud, may be similarly signed and uploaded. If key server module 232 is successfully authenticated after upload and prior to execution, one or more cryptographic keys may be retrieved from cryptographic key storage 234 and uploaded. The retrieved keys may then be used in operations on the uploaded data, as described herein. In some embodiments, data access policy may be uploaded with data processing module(s) 236 and/or cryptographic keys 234. For example, data access policy may include policies associated with when, how and by whom data may be accessed.

Thus, secure processing module 221 may be configured to manage encrypting and decrypting data for upload to and retrieval from the cloud service 102. The secure processing module 221 may be further configured to manage requesting and evaluating authentication information related to key server module 232 after it has been provisioned to the cloud service 108. In this manner, cryptographic key management may remain with RKM server 111 and client system 104a.

Figure 3:
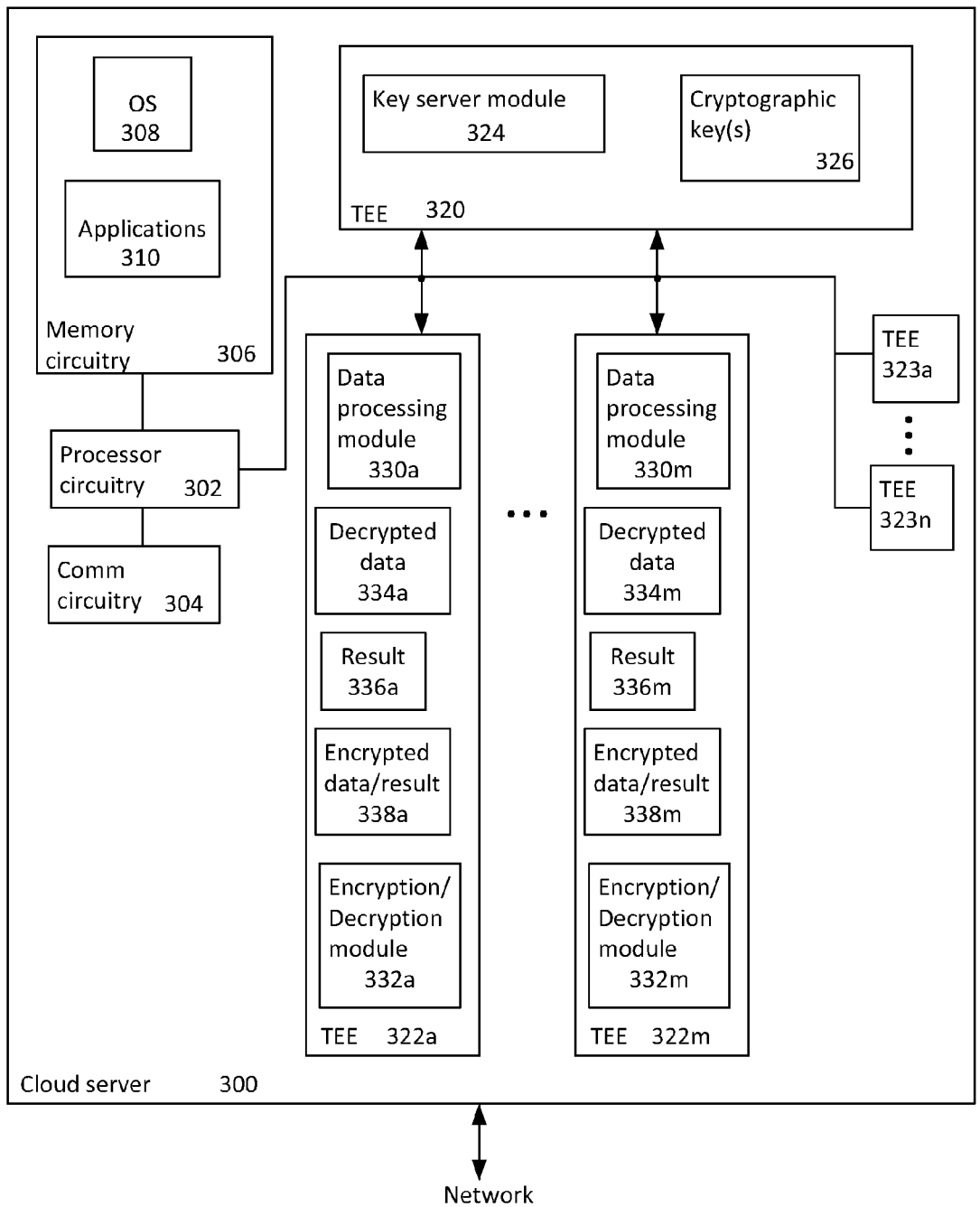
FIG. 3 illustrates an example cloud server consistent with various embodiments of the present disclosure.

FIG. 3 illustrates an example cloud server 300. Cloud server 300 corresponds to a cloud server, e.g., cloud server 120a, included in cloud service 102. The following description of cloud server 300 may be better understood when read in conjunction with FIGS. 1 and 2. Cloud server 300 may include processor circuitry 302, communication circuitry 304 and memory circuitry 306. Memory circuitry 306 may include operating system 308 and one or more application(s) 310. Processor circuitry 302 may include one or more processors configured to perform operations associated with cloud server 300. Communication circuitry 304 is configured to communicate, wired and/or wirelessly, with client systems 104a, . . . , 104m via network(s) 106a, 106b and/or one or more storage device(s) 122a, . . . , 122n, using one or more communication protocols, as described herein. The communication protocols may include, but are not limited to, Wi-Fi, 3G, 4G, Ethernet and/or some other communication protocol.

Cloud server 300 may include one or more trusted execution environments TEE 320, 322a, . . . , 322m, 323a, . . . , 323n. Trusted execution environments 320, 322a, . . . , 322m, 323a, . . . , 323n are configured to provide a trusted execution and storage environment, e.g., may comply with a Trusted Platform Module (TPM) protocol, as described herein. TEEs 320, 322a, . . . , 322m, 323a, . . . , 323n may come in various forms or be provided by various technologies, such as Trusted Execution Technology ("TXT") by the Intel Corporation of Santa Clara, Calif., Manageability Engine ("ME"), the Trust-Zone Security System by ARM Holdings in Cambridge, United Kingdom, Virtualization Technology ("VT-x"), or microcode enforced thread and memory access isolation. Cloud server 300 illustrates one example of a cloud server after a key server module, e.g., key server module 324, and data processing module(s), e.g., data processing module(s) 330a, . . . , 330m, have been loaded into the respective TEE 320 and/or 322a, . . . , 322m. In some embodiments, key server module 324 and the data processing module(s) 330a, . . . , 330m may be loaded into TEE 320.

TEE 323a, . . . , 323n may be utilized by other cloud customers (i.e., clients) and/or one or more of computing device(s) 112a, . . . , 112n. TEE 323a, . . . , 323n are configured to be secure from, e.g., TEE 320. For example, if computing device 112a is associated with data processing to be performed, e.g., by TEE 322a, . . . , 322m, then one or more other computing devices, e.g., 112b, . . . , 112n may be configured to utilize one or more of TEEs 323a, . . . , 323n. Thus, individual trusted execution environments are configured to be separate and secure from other individual trusted execution environments.

TEE 320 is configured to provide remote attestation of key server module 324 to gateway server 110 prior to executing key server module 324. The key server module 324 may have been provided to TEE 320 along with a digital signature by RKM server 111 via gateway server 110. The digital signature may include a hash of the key server module encrypted by a private key of an asymmetric (i.e., public/private) key pair. The public key and private key may be included in cryptographic keys 234 included in memory circuitry 206. Gateway server 110 may be configured to provide the public key of the public/private key pair to TEE 320 for attestation. In some embodiments, the public key may be included in a certificate signed by RKM server 111 and/or a certificate authority. In these embodiments, a certificate public key may be provided to TEE 320 by, e.g., a secure channel, prior to uploading key server module 324.

TEE 320 may then be configured to hash key server module 324 and decrypt the signature using the public key. If the hash results match, then TEE 320 is configured to attest to gateway server 110 and thereby RKM server 111 regarding key server module 324. In the embodiments that include a certificate, TEE 320 may be configured to first confirm that the public key corresponds to an identity of RKM server 111 prior to verifying key server module 324. Thus, TEE 320 is configured to confirm that key server module 324 is the key server module 232 uploaded from RKM server 111 via gateway server 110.

TEE 320 may then be configured to execute key server module 324. Key server module 324 may then be configured to establish a secure communication channel with gateway server 110 if the attestation is successful (i.e., if the key server module 324 verifies). The secure channel may be established using known techniques, e.g., cryptographic methods. Key server module 324 may then be configured to receive one or more cryptographic keys 326 from RKM server 111 via gateway server 110 and to store the keys securely in TEE 320.

In some embodiments, TEE 320 may be configured as a "master" trusted execution environment based on the functionality of key server module 324. TEEs 322a, . . . , 322m may be configured as "child" trusted execution environments relative to master TEE 320, e.g., because TEEs 322a, . . . , 322m include data processing modules 330a, . . . , 330m, respectively, that may rely on key server module 324 to provide cryptographic keys for encrypting and/or decrypting data, as described herein. Key server module 324 may be configured to verify the data processing module(s) 330a, . . . , 330m prior to establishing the trusted channel. Key server module 324 may be configured to establish trusted and/or secure communication with data processing modules 330a, . . . , 330m in order for key server module 324 to provide cryptographic keys to TEEs 322a, . . . , 322m.

Each data processing module 330a, . . . , 330m is configured to provide attestation prior to receiving cryptographic key(s). Thus, each data processing module 330a, . . . , 330m may have been provided to cloud server 300 along with a digital signature that may be utilized (along with a public key and/or certificate) to verify the data processing module 330a, . . . , 330m. For example, RKM server 111 may be configured to sign each data processing module 330a, . . . , 330m prior to gateway server 110 providing the data processing module 330a, . . . , 330m to cloud server 300. In some embodiments, the data processing modules 330a, . . . , 330m may be configured to attest to the key server module 324 prior to a secure channel being established between the key server module 324 and the respective data processing module. If the attestations are successful, each TEE 322a, . . . , 322m is configured to confirm that each data processing module 330a, . . . , 330m corresponds to the respective data processing module 330a, . . . , 330m uploaded from RKM server 111 via gateway server 110 and to allow the respective data processing module(s) 330a, . . . , 330m to execute in the respective TEE 322a, . . . , 322m. In some embodiments, the key server module 324 may be configured to communicate whether the data processing module verified to the gateway server 110 and thereby the RKM server 111, as described herein.

In operation, each data processing module 330a, . . . , 330m is configured to retrieve one or more blocks of encrypted data from one or more of cloud storage device(s) 122a, . . . , 122n and to load the encrypted data in respective encrypted data/result storage 338a, . . . , 338m in respective TEE 322a, . . . , 322m. Each data processing module 330a, . . . , 330m is configured to establish a secure communication channel with TEE 320 and to retrieve one or more cryptographic keys from TEE 320. In some embodiments, the cryptographic keys may be symmetric keys. It is possible to use symmetric keys as they have been provided via secure channels, e.g., from RKM server 111 via gateway server 110 to TEE 320 and from TEE 320 to TEEs 322a, . . . , 322m. Encryption and/or decryption using symmetric keys is typically faster than encryption and/or decryption using a public key of an asymmetric key pair.

Each TEE 322a, . . . , 322m may include an encryption/decryption module 332a, . . . , 332m configured to perform encryption and/or decryption on, e.g., data. Encrypted data 338a, . . . , 338m may be decrypted by respective cryptographic module 332a, . . . , 332m and the decrypted data 334a, . . . , 334m may be stored in respective TEE 322a, . . . , 322m. Data processing module 330a, . . . , 330m may then process the decrypted data 334a, . . . , 334m and store a result 336a, . . . , 336m in TEE 322a, . . . , 322m secure storage. Cryptographic module 332a, . . . , 332m may then encrypt the result 336a, . . . , 336m and store the encrypted result 336a, . . . , 336m in TEE 322a, . . . , 322m prior to storing the encrypted result in one or more of cloud storage devices 122a, . . . , 122n and/or providing the encrypted result to gateway server 110. In some embodiments, encrypted data and encrypted result may not be stored in the respective TEE 322a, . . . , 322m. In these embodiments, the encrypted data may be loaded into the respective TEE 322a, . . . , 322m, decrypted by cryptographic module 332a, . . . , 332m and stored in TEE 322a, . . . , 322m as decrypted data. After processing, the result 336a, . . . , 336m may be encrypted by cryptographic module 332a, . . . , 332m and stored in, e.g., cloud storage device 122a, . . . , 122n and/or provided to gateway server 110.

Thus, data uploaded to cloud storage devices 122a, . . . , 122n, data moving between cloud storage devices and TEE 322a, . . . , 322m and downloaded to gateway server 110 may be encrypted and relatively secure from other clients of cloud service 102 and/or the cloud service itself. While in the cloud, the data may be decrypted only in a trusted execution environment configured to provide secure storage and configured to be inaccessible to other clients of cloud service 102.

Thus, a system and method consistent with the present disclosure are configured to facilitate trusted data processing in the public cloud by ensuring data in insecure storage and/or travelling on insecure channels is encrypted. Data is decrypted and processed in a trusted execution environment. Key management is provided by a key server module configured to provide attestation and cryptographic keys are managed by the client RKM server and the verified key server module.

Figure 4:
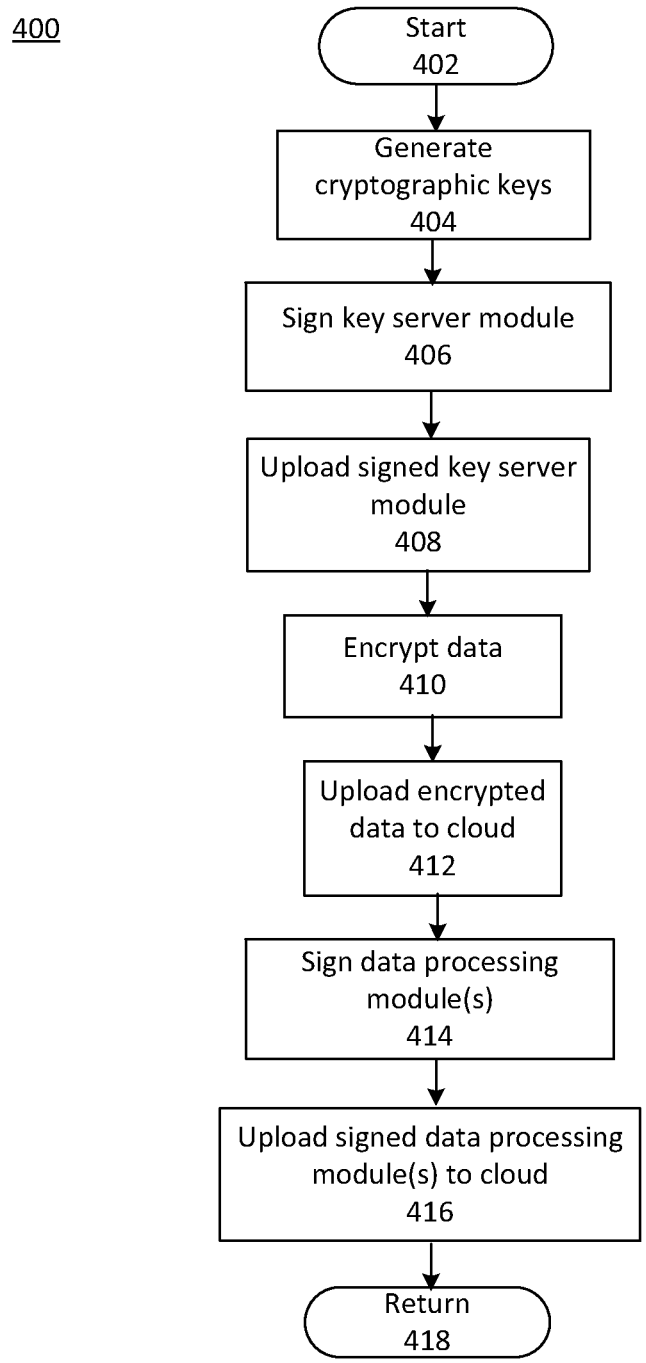
FIG. 4 illustrates a flowchart of exemplary operations of a customer gateway server consistent with various embodiments of the present disclosure.

FIG. 4 illustrates an flowchart 400 of exemplary operations consistent with an embodiment of the present disclosure. The operations may be performed, for example, by RKM server 111 and/or customer gateway server 110. In particular, flowchart 400 depicts exemplary operations configured to generate cryptographic keys, encrypt data and provide encrypted data, signed key server module and signed data processing module(s) to the cloud.

Operations of flow chart 400 may begin with start 402. Operation 404 may include generating cryptographic keys. For example, the cryptographic keys may be generated in a trusted execution environment in RKM server 111. A key server module may be digitally signed at operation 406. For example, secure processing module 221 may be configured to hash the key server module and encrypt the hash using a private key of an asymmetric key pair. Operation 408 may include uploading the signed key server module to the cloud service 102. Data may be encrypted at operation 410. For example, data may encrypted using at least one of the cryptographic keys. For example, the keys may correspond to randomly generated symmetric keys generated using the American Encryption Standard (AES). Operation 412 may include uploading the encrypted data to the cloud, e.g., to cloud service 102. One or more data processing module(s) may be digitally signed at operation 414. The signed data processing modules may be uploaded to the cloud service at operation 416. Program flow may return at operation 418

Thus, data uploaded and/or stored in a cloud storage device may be encrypted prior to transmission and storage. A key server module and one or more data processing modules may be digitally signed, the digital signature configured to provide an attestation capability.

Operations 406 and 408 may generally be performed fewer times than operations 410 through 416. In other words, the key server module is configured to provide key management functions for a plurality of data processing modules. Thus, once the key server module has been uploaded, it may be configured as a key management service. Similarly, encrypted data that has been uploaded may be processed by one or more of the data processing module(s) repeatedly, e.g., in response to requests from computing device(s) 112a, . . . , 112n for data processing. If the encrypted data has been uploaded and exists in cloud service 102 then it does not need to be uploaded again. Thus, a key server module configured to provide key management functions, encrypted data and data processing modules may be uploaded to the cloud.

Figure 5:
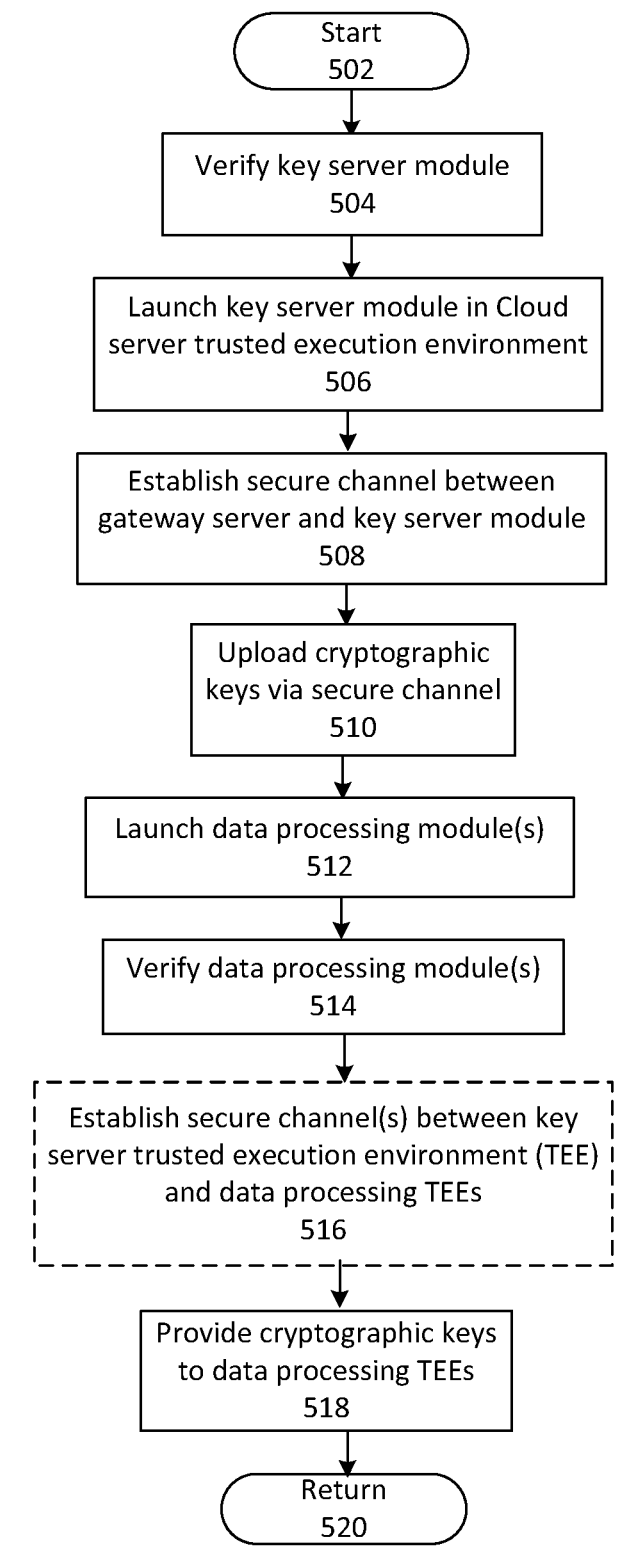
FIG. 5 illustrates a flowchart of exemplary operations related to a key server module consistent with various embodiments of the present disclosure.

FIG. 5 illustrates an flowchart 500 of exemplary operations consistent with an embodiment of the present disclosure. The operations may be performed, for example, by cloud server 120a, gateway server 110 and/or RM server 111. In particular, flowchart 500 depicts exemplary operations of the trusted execution environment configured to provide attestation of a key server module and data processing module(s). The exemplary operations are further configured to provide cryptographic key(s) via secure channels between gateway server 110 and cloud server 120a and between the key server module and data processing module(s).

The operations of flow chart 500 may begin at start 502. The key server module may be verified at operation 504. For example, the key server module may be configured to attest to gateway server and/or RKM server using a public key provided by RKM server 111 via gateway server 110, the public key corresponding to a private key used to digitally sign the key server module. Operation 506 may include launching the key server module in the cloud server trusted execution environment. Operation 508 may include establishing a secure channel between gateway server and the key server module. Cryptographic keys provided by the RKM server may be uploaded via the secure channel at operation 510. Data processing modules may be launched in one or more TEE(s) at operation 512. The data processing modules may be verified at operation 514. For example, the data processing modules may be configured to attest to the key server module using a public key provided by the RKM server via the gateway server, the public key corresponding to a private key used to digitally sign the data processing modules. In some embodiments, the data processing modules may be configured to attest to gateway server 110 and/or RKM server 111. Secure channels may be established between key server TEE and data processing TEEs at operation 516. Key server module may be configured to verify the data processing modules prior to establishing the secure channels. Operation 518 may include providing cryptographic keys to data processing TEEs by the key server TEE via the secure channels. Program flow may return at operation 520.

Thus, the key server module and the data processing modules may be attested to (i.e., verified) using the trusted execution environment prior to secure channels being established and prior to cryptographic keys being provided. The public key (that may be certified) may be used in the measurement configured to confirm that the key server module and data processing modules that are executing in the cloud are the modules that were uploaded from the RKM server by the gateway server.

Figure 6:
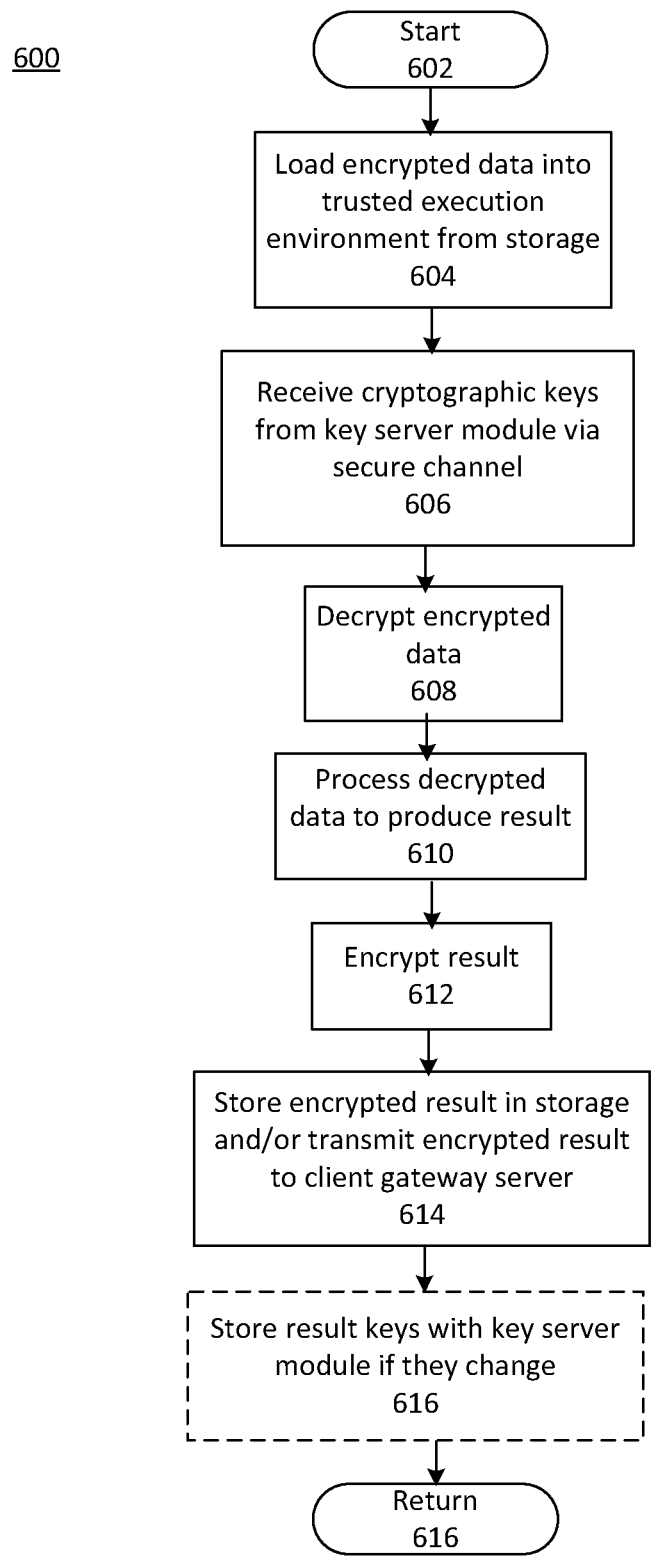
FIG. 6 illustrates a flowchart of exemplary operations for data processing in the cloud consistent with various embodiments of the present disclosure.

FIG. 6 illustrates an flowchart 600 of exemplary operations consistent with an embodiment of the present disclosure. The operations may be performed, for example, by data processing modules 330a, . . . , 330m. In particular, flowchart 600 depicts exemplary operations of the data processing modules configured to retrieve encrypted data from, e.g., cloud storage devices, decrypt and process the data and encrypt the result in a trusted execution environment securely and return the encrypted result to storage and/or to gateway server for provision to a requesting computing device.

The operations of flow chart 600 may begin at start 602. Operation 604 may include loading encrypted data from storage into the trusted execution environment. Cryptographic keys may be received from the key server module via a secure channel established for that purpose at operation 606. Operation 606 of FIG. 6 is complementary to operation 518 of FIG. 5. Operation 608 may include decrypting the retrieved data using the cryptographic key(s). The decrypted data may be processed to produce a result at operation 610. The result may be encrypted at operation 612 using the cryptographic key(s). The encrypted result may be stored in a cloud storage device and/or transmitted to, e.g., gateway server for provision to the requesting computing device at operation 614. In some embodiments, operation 616 may include providing result key(s) to key server module, if result keys are modified. Program flow may return at operation 618.

Thus, data may be protected by encryption when it is travelling and/or stored in insecure storage. Data may be decrypted and processed in a trusted execution environment and the result may be encrypted prior to being stored or transmitted.

Figure 7:
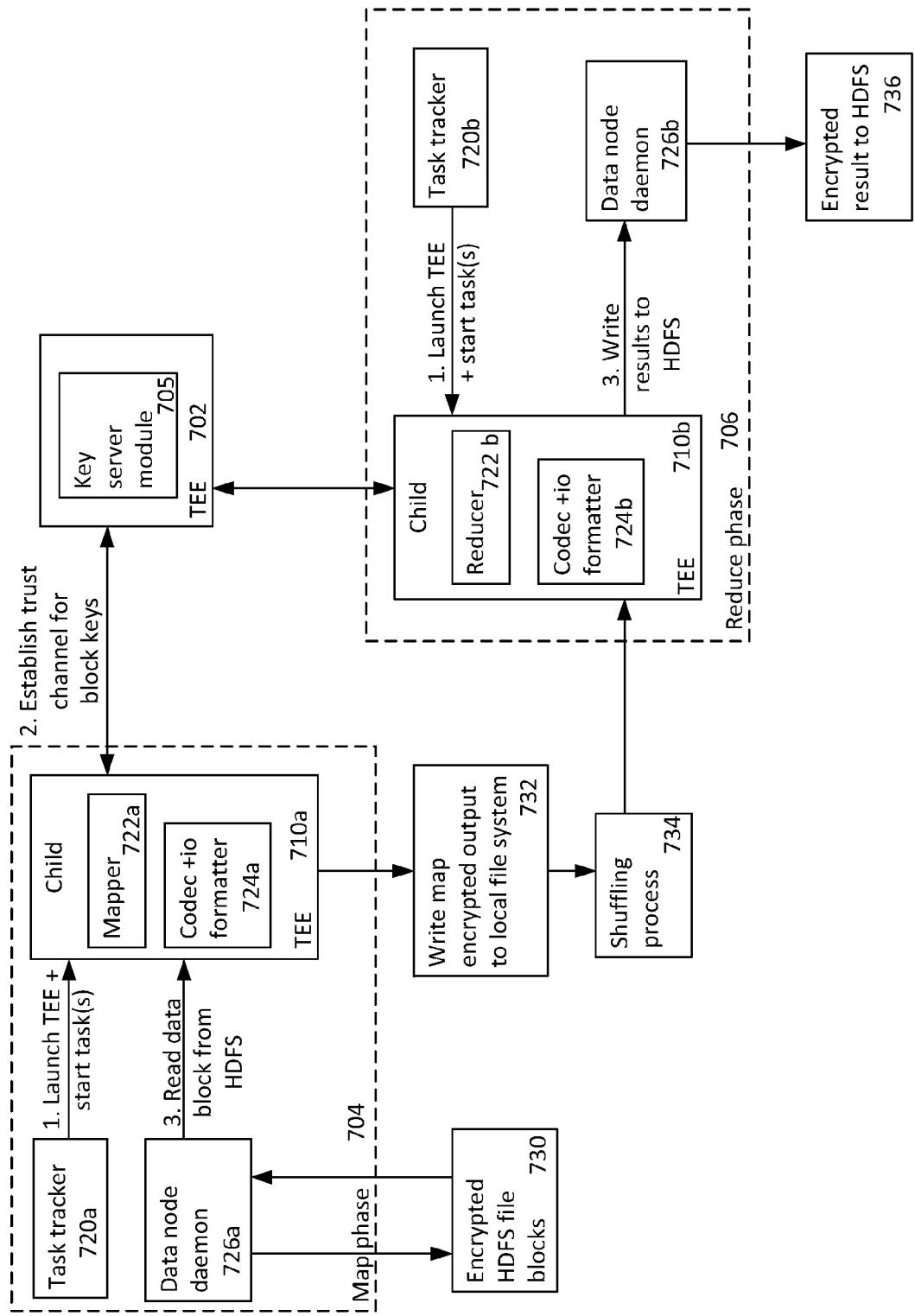
FIG. 7 illustrates an Apache Hadoop data processing example consistent with one embodiment of the present disclosure.

FIG. 7 depicts an Apache Hadoop data processing example consistent with one embodiment of the present disclosure. In particular, FIG. 7 depicts flow associated with a map-reduce application in Hadoop. Apache Hadoop is an open-source software framework that supports data-intensive distributed applications. It supports executing data processing applications using cloud services such as cloud service 102. Hadoop implements a computational paradigm named Map-Reduce, where the data processing is divided into many small blocks of data, each of which may be executed or re-executed on any cloud server in the server storage system. In addition, it provides a distributed file system ("HDFS") that may store data on cloud storage devices. Apache Hadoop enables applications to work with thousands of computation-independent computers and petabytes of data. Thus, data processing utilizing the Hadoop framework, e.g., Map-Reduce, may be performed utilizing a system and method consistent with the present disclosure. A general description of data processing utilizing the Hadoop framework is included below followed by a specific description of FIG. 7.

Initially, a client, e.g., computing device 112a via gateway server 110, may submit a map-reduce processing job to Hadoop JobTracker queues. Input splits of HDFS data may then be computed. In other words, data may be split into blocks ("input splits") corresponding to the splits. RKM server 111 may be configured to encrypt the blocks of data and gateway server 110 may be configured to upload the encrypted blocks to, e.g., cloud service 102, where they may be stored in shared storage. Gateway server may also upload a key server module 705, a mapper module 722a and a reducer module 722b to cloud service 102.

A job tracker is configured to coordinate the data processing job. The job tracker is configured to put the processing job into an internal queue. A job scheduler is configured to retrieve the processing job and initialize it. The job scheduler may then retrieve the encrypted data blocks from the shared storage and create one map for each split (block). Task trackers may then schedule the tasks that the job has been split into. The job schedule attempts to run the task on the same node that the data split resides on. In other words, the job scheduler attempts to run the task using a cloud server local to the cloud storage device that stores the data split.

On a data split node, e.g., cloud server 120a, task tracker creates an instance of task runner to run the map or reduce task. Task runner launches the task in a trusted execution environment. On first launch, the map or reduce task attests to the key server and retrieves cryptographic keys for data splits, for writing intermediate results and for audit on its node or HDFS. The map or reduce application reads encrypted data associated with the split from HDFS. The map or reduce task in the trusted execution environment then decrypts the data with block keys retrieved from key server module and executes the data processing application on plain (i.e., decrypted) data. The map or reduce task then encrypts the intermediate result and writes the encrypted intermediate result to a local cloud storage device, e.g., a hard disk drive.

A remote result reader may then read encrypted result from HDFS using a Hadoop client application. The result reader may then attest to the key server module and retrieve keys to decrypt and/or audit the data.

Referring to FIG. 7, a map phase 704 and a reduce phase 706 of the map-reduce processing are illustrated. Key server module 705, mapper 722a, reducer 722b and codec & io formatters 724a, 724b may be signed by, e.g., RKM server 111 and uploaded to cloud server 120*a* by gateway server 110, as described herein. Trusted execution module TEE 702 may then include key server module 705. Key server module 705 is configured to manage cryptographic keys for mapper 722*a* and reducer 722*b*, as described herein. TEE 702 may be configured to verify key server module 705 prior to launching key server module 705, as described herein. Task trackers 720*a*, 720*b* may be configured to launch TEE 710*a*, 710*b* and start their respective tasks. For example, TEE 710*a* may be configured to verify mapper 722*a*, codec & io formatter 724*a* and TEE 710*b* may be configured to verify reducer 722*b*, codec & io formatter 724*b*, as described herein. Mapper 722*a*, codec & io formatter 724*a*, reducer 722*b* and/or codec & io formatter 724*b* may be configured to attest to key server module 705, as described herein. Key server module 705 may then be configured to establish secure communication channels between key server module 705 and mapper 722*a* and reducer 722*b*.

The mapper 722*a* and the reducer 722*b* may then be configured to use these secure channels to retrieve cryptographic keys from key server module 705, as described herein. Data node daemon 726*a* is configured to read encrypted data from encrypted HDFS file blocks 730 and to provide the encrypted blocks to TEE 710*a* and mapper 722*a* where the blocks may be decrypted using the key from key server module 705, processed and the intermediate result encrypted also using a key from key server module 705. The encrypted intermediate results may then be written to local file system 732. The encrypted intermediate results may then be further processed by shuffling process 734 that is configured to process encrypted data. The shuffled encrypted data may then be provided to the reduce phase 706 and, in particular, TEE 710*b* and reducer 722*b*, where the blocks may be decrypted using the key from key server module 705, processed and the result encrypted also using a key from key server module 705. The encrypted result may then be written to HDSF 736 by data node daemon 726*b*.

Thus, using a Hadoop example for illustration, data moving via unsecure and/or untrusted channels is encrypted. The key server module and data processing modules (e.g., mapper and reducer) may be signed, uploaded and may be verified in a trusted execution environment. The data may be retrieved from unsecure storage and decrypted and processed in the trusted execution environment. The result may then be encrypted for storage or return to the unsecure storage. A client, e.g., RKM server 111, may retain control of the keys, may be provided attestation before the key server module is allowed to execute and/or any data processing modules are provided cryptographic keys. Thus, client data is protected by encryption and therefore more secure and less susceptible to breach by other users of the cloud service and/or the cloud service itself.

While FIGS. 4 through 6 illustrate various operations according one embodiment, it is to be understood that not all of the operations depicted in FIGS. 4 through 6 are necessary for other embodiments. Indeed, it is fully contemplated herein that in other embodiments of the present disclosure, the operations depicted in FIGS. 4 through 6 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Any of the operations described herein may be implemented in a system that includes one or more storage mediums having stored thereon, individually or in combination, instructions that when executed by one or more processors perform the methods. Here, the processor may include, for example, a server CPU and/or other programmable circuitry. Also, it is intended that operations described herein may be distributed across a plurality of physical devices, such as processing structures at more than one different physical locations. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

Gateway server 110 may be configured to communicate with networks 106*a* and 106*n*, RKM server 111, computing devices 112*a*, . . . , 112*n*, client data storage 113, client systems 104*b*, . . . , 104*m* and/or cloud service 102 and cloud servers 120*a*, . . . , 120*m* may be configured to communicate with networks 106*b* and 106*c*, cloud storage devices 122*a*, . . . , 122*n* and/or server storage systems 108*b*, . . . , 108*n* using a variety of communication protocols. The communications protocols may include but are not limited to wireless communications protocols, such as Wi-Fi, 3G, 4G and/or other communication protocols. The Wi-Fi protocol may comply or be compatible with the 802.11 standards published by the Institute of Electrical and Electronics Engineers (IEEE), titled "IEEE 802.11-2007 Standard, IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications" published, Mar. 8, 2007, and/or later versions of this standard.

The 3G protocol may comply or be compatible with the International Mobile Telecommunications (IMT) standard published by the International Telecommunication Union (ITU), titled "IMT-2000", published in 2000, and/or later versions of this standard. The 4G protocol may comply or be compatible with IMT standard published by the ITU, titled "IMT-Advanced", published in 2008, and/or later versions of this standard.

For example, networks 106*a*, . . . , 106*n* may comprise a packet switched network. Gateway server 110 may be configured to communicate with networks 106*a* and 106*n*, RKM server 111, computing devices 112*a*, . . . , 112*n*, client data storage 113, client systems 104*b*, . . . , 104*m* and/or cloud service 102 and cloud servers 120*a*, . . . , 120*m* may be configured to communicate with networks 106*b* and 106*c*, cloud storage devices 122*a*, . . . , 122*n* and/or server storage systems 108*b*, . . . , 108*n* using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternatively or additionally, gateway server 110 may be configured to communicate with networks 106a and 106n, RKM server 111, computing devices 112a, ..., 112n, client data storage 113, client systems 104b, ..., 104m and/or cloud service 102 and cloud servers 120a, ..., 120m may be configured to communicate with networks 106b and 106c, cloud storage devices 122a, ..., 122n and/or server storage systems 108b, ..., 108n, using an X.25 communications protocol. The X.25 communications protocol may comply or be compatible with a standard promulgated by the International Telecommunication Union-Telecommunication Standardization Sector (ITU-T). Alternatively or additionally, gateway server 110 may be configured to communicate with networks 106a and 106n, RKM server 111, computing devices 112a, ..., 112n, client data storage 113, client systems 104b, ..., 104m and/or cloud service 102 and cloud servers 120a, ..., 120m may be configured to communicate with networks 106b and 106c, cloud storage devices 122a, ..., 122n and/or server storage systems 108b, ..., 108n, using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, gateway server 110 may be configured to communicate with networks 106a and 106n, RKM server 111, computing devices 112a, ..., 112n, client data storage 113, client systems 104b, ..., 104m and/or cloud service 102 and cloud servers 120a, ..., 120m may be configured to communicate with networks 106b and 106c, cloud storage devices 122a, ..., 122n and/or server storage systems 108b, ..., 108n, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

The trusted execution environments TEE 220, 320, 322a, ..., 322m, 323a, ..., 323n, 702, 710a, 710b are configured to provide a trusted execution and storage environment. TEE 220, 320, 322a, ..., 322m, 323a, ..., 323n, 702, 710a, 710b may comply or be compatible with the Trusted Platform Module standard, published July 2007 by JTC1, a joint committee of the International Organization for Standardization (ISO), and IEC, the International Electrotechnical Commission, entitled the "Trusted Computing Group Trusted Platform Module specification Version 1.2" as ISO/IEC standard 11889, and/or later versions of this standard.

AES symmetric key protocol may comply or be compatible with the Advanced Encryption Standard, published Nov. 26, 2001 by the National Institute of Standards (NIST) and/or later versions of this standard.

Apache Hadoop is an open source software framework maintained by Apache Software Foundation. It supports running applications on clusters of commodity hardware, e.g., cloud service 102. Hadoop implements a computational paradigm named MapReduce, where an application is divided into many small fragments of work, e.g., blocks of data, each of which may be executed or re-executed on any node (e.g., cloud servers 120a, ..., 120m) in the cluster. In addition, it provides a distributed file system (Hadoop Distributed File System (HDFS)) that stores data on the compute nodes (e.g., storage device(s) 122a, ..., 122n). Apache Hadoop, as described herein, may comply or be compatible with Release 1.0.0, released Dec. 27, 2011 and/or later versions of this framework.

As used in any embodiment herein, the term "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Thus, a system and method consistent with the present disclosure is configured to facilitate secure data processing in the public cloud. Client data may be encrypted prior to transmission to/from the cloud and while stored in insecure storage in the cloud. Client data may be decrypted for processing in a trusted execution environment included in a cloud server. Key management functions may be provided by a key server module provided by a root key management server included in a client system. The key server module may be digitally signed and uploaded to the cloud by, e.g., a gateway server, for execution in the trusted execution environment. The key server module may be verified prior to execution in the trusted execution environment. The RKM server may maintain root key(s) in local secure storage and may provide cryptographic key(s) to key server module via a secure channel if the key server module verifies. Key server module may then store the cryptographic keys sealed to its identity in secure storage. Data processing modules may be similarly digitally signed and configured to perform data processing functions in one or more trusted execution environments. The data processing modules may be configured to attest to the key server module prior to receiving cryptographic keys(s).

According to one aspect there is provided a system. The system may include a cloud server comprising a first trusted execution environment, the cloud server one of a plurality of cloud servers configured to perform data processing operations for a plurality of clients; a cloud storage device coupled to the cloud server; a root key management ("RKM") server comprising a key server module, the RKM server configured to sign the key server module using a first private key; and a gateway server configured to provide the signed key server module to the cloud server, the first trusted execution environment configured to verify the key server module using a first public key related to the first private key and to launch the key server module if the key server module verifies, the key server module configured to establish a first secure communication channel between the gateway server and the key server module, and the gateway server configured to provide a first cryptographic key to the key server module via the first secure communication channel.

Another example system includes the forgoing components and the cloud server comprises a second trusted execution environment, the RKM server is configured to sign a data processing module using a second private key, and the gateway server is configured to provide the signed data processing module and a plurality of blocks of encrypted data to the cloud server, the plurality of blocks of encrypted data including the block of encrypted data, the cloud server is configured to store the plurality of blocks of encrypted data in the cloud storage device, and the second trusted execution environment is configured to launch the data processing module and to verify the data processing module using a second public key related to the second private key.

Another example system includes the forgoing components and the key server module is configured to establish a second secure communication channel between the data processing module and the key server module and to provide the first cryptographic key to the data processing module via the second secure communication channel if the data processing module verifies.

Another example system includes the forgoing components and the data processing module is configured to: load the block of encrypted data into the second trusted execution environment, decrypt the block of encrypted data using the first cryptographic key to yield a corresponding block of decrypted data, process the block of decrypted data to produce a result, encrypt the result, and at least one of store the encrypted result in the cloud storage device or provide the encrypted result to the gateway server.

Another example system includes the forgoing components and the RKM server is configured to generate the first cryptographic key.

Another example system includes the forgoing components and the first public key is certified by the RKM server.

Another example system includes the forgoing components and the first trusted execution environment and the second trusted execution environment are the same trusted execution environment.

Another example system includes the forgoing components and the data processing module is configured to encrypt the result using a second cryptographic key provided by the key server module.

According to another aspect there is provided a method. The method may include providing a key server module from a root key management ("RKM") server to a cloud server of a plurality of cloud servers configured to perform data processing operations for a plurality of clients, the cloud server coupled to a cloud storage device, the key server module signed using a first private key; verifying the key server module using a first public key related to the first private key; launching the key server module in a first trusted execution environment in the cloud server if the key server module verifies; establishing a first secure communication channel between a gateway server and the key server module; and providing a first cryptographic key from the gateway server to the key server module via the first secure communication channel, the first cryptographic key configured to decrypt a block of encrypted data.

Another example method includes the forgoing operations and further includes providing a plurality of blocks of encrypted data from the gateway server to the cloud server, the plurality of blocks of encrypted data including the block of encrypted data; storing the plurality of blocks of encrypted data in the cloud storage device; providing a data processing module from the gateway server to the cloud server, the data processing module signed using a second private key; launching the data processing module in a second trusted execution environment in the cloud server; and verifying the data processing module using a second public key related to the second private key.

Another example method includes the forgoing operations and further includes establishing a second communication channel between the data processing module and the key server module if the data processing module verifies; and providing the first cryptographic key from the key server module to the data processing module via the second secure communication channel.

Another example method includes the forgoing operations and further includes loading the block of encrypted data into the second trusted execution environment; decrypting the block of encrypted data using the first cryptographic key to yield a corresponding block of decrypted data; processing the block of decrypted data by the data processing module to produce a result; encrypting the result; and at least one of storing the encrypted result in the cloud storage device or providing the encrypted result to the gateway server.

Another example method includes the forgoing operations and further includes generating the first cryptographic key by the RKM server.

Another example method includes the forgoing operations and the first public key is certified by the RKM server.

Another example method includes the forgoing operations and the first trusted execution environment and the second trusted execution environment are the same trusted execution environment.

Another example method includes the forgoing operations and the result is encrypted using a second cryptographic key provided to the data processing module by the key server module.

According to another aspect there is provided a system. The system may include one or more storage mediums having stored thereon, individually or in combination, instructions that when executed by one or more processors result in the following operations including: providing a key server module from a root key management ("RKM") server to a cloud server of a plurality of cloud servers configured to perform data processing operations for a plurality of clients, the cloud server coupled to a cloud storage device, the key server module signed using a first private key; verifying the key server module using a first public key related to the first private key; launching the key server module in a first trusted execution environment in the cloud server if the key server module verifies; establishing a first secure communication channel between a gateway server and the key server module; and providing a first cryptographic key from the gateway server to the key server module via the first secure communication channel, the first cryptographic key configured to decrypt a block of encrypted data.

Another example system includes instructions that when executed by one or more processors result in the forgoing operations and further includes providing a plurality of blocks of encrypted data from the gateway server to the cloud server, the plurality of blocks of encrypted data including the block of encrypted data; storing the plurality of blocks of encrypted data in the cloud storage device; providing a data processing module from the gateway server to the cloud server, the data processing module signed using a second private key; launching the data processing module in a second trusted execution environment in the cloud server; and verifying the data processing module using a second public key related to the second private key.

Another example system includes instructions that when executed by one or more processors result in the forgoing operations and further includes establishing a second secure communication channel between the data processing module and the key server module if the data processing module verifies; and providing the first cryptographic key from the key server module to the data processing module via the second secure communication channel.

Another example system includes instructions that when executed by one or more processors result in the forgoing operations and further includes loading the block of encrypted data into the second trusted execution environment; decrypting the block of encrypted data using the first cryptographic key to yield a corresponding block of decrypted data; processing the block of decrypted data by the data processing module to produce a result; encrypting the result; and at least one of storing the encrypted result in the cloud storage device or providing the encrypted result to the gateway server.

Another example system includes instructions that when executed by one or more processors result in the forgoing operations and further includes generating the first cryptographic key by the RKM server.

Another example system includes instructions that when executed by one or more processors result in the forgoing operations and includes that the first public key is certified by the RKM server.

Another example system includes instructions that when executed by one or more processors result in the forgoing operations and further includes that the first trusted execution environment and the second trusted execution environment are the same trusted execution environment.

Another example system includes instructions that when executed by one or more processors result in the forgoing operations and further includes that the result is encrypted using a second cryptographic key provided to the data processing module by the key server module.

According to one aspect there is provided a system. The system may include a cloud server comprising a first trusted execution environment, the cloud server one of a plurality of cloud servers configured to perform data processing operations for a plurality of clients; a cloud storage device coupled to the cloud server; a root key management ("RKM") server comprising a key server module, the RKM server configured to sign the key server module using a first private key; and a gateway server configured to provide the signed key server module to the cloud server, the first trusted execution environment configured to verify the key server module using a first public key related to the first private key and to launch the key server module if the key server module verifies, the key server module configured to establish a first secure communication channel between the gateway server and the key server module, and the gateway server configured to provide a first cryptographic key to the key server module via the first secure communication channel.

Another example system includes the forgoing components and the cloud server comprises a second trusted execution environment, the RKM server is configured to sign a data processing module using a second private key, and the gateway server is configured to provide the signed data processing module and a plurality of blocks of encrypted data to the cloud server, the plurality of blocks of encrypted data including the block of encrypted data, the cloud server is configured to store the plurality of blocks of encrypted data in the cloud storage device, and the second trusted execution environment is configured to launch the data processing module and to verify the data processing module using a second public key related to the second private key.

Another example system includes the forgoing components and the key server module is configured to establish a second secure communication channel between the data processing module and the key server module and to provide the first cryptographic key to the data processing module via the second secure communication channel if the data processing module verifies.

Another example system includes the forgoing components and the data processing module is configured to: load the block of encrypted data into the second trusted execution environment, decrypt the block of encrypted data using the first cryptographic key to yield a corresponding block of decrypted data, process the block of decrypted data to produce a result, encrypt the result, and at least one of store the encrypted result in the cloud storage device or provide the encrypted result to the gateway server.

Another example system includes the forgoing components and the RKM server is configured to generate the first cryptographic key.

Another example system includes the forgoing components and the first public key is certified by the RKM server.

Another example system includes the forgoing components and the data processing module is configured to encrypt the result using a second cryptographic key provided by the key server module.

According to another aspect there is provided a method. The method may include providing a key server module from a root key management ("RKM") server to a cloud server of a plurality of cloud servers configured to perform data processing operations for a plurality of clients, the cloud server coupled to a cloud storage device, the key server module signed using a first private key; verifying the key server module using a first public key related to the first private key; launching the key server module in a first trusted execution environment in the cloud server if the key server module verifies; establishing a first secure communication channel between a gateway server and the key server module; and providing a first cryptographic key from the gateway server to the key server module via the first secure communication channel, the first cryptographic key configured to decrypt a block of encrypted data.

Another example method includes the forgoing operations and further includes providing a plurality of blocks of encrypted data from the gateway server to the cloud server, the plurality of blocks of encrypted data including the block of encrypted data; storing the plurality of blocks of encrypted data in the cloud storage device; providing a data processing module from the gateway server to the cloud server, the data processing module signed using a second private key; launching the data processing module in a second trusted execution environment in the cloud server; and verifying the data processing module using a second public key related to the second private key.

Another example method includes the forgoing operations and further includes establishing a second secure communication channel between the data processing module and the key server module if the data processing module verifies; and providing the first cryptographic key from the key server module to the data processing module via the second secure communication channel.

Another example method includes the forgoing operations and further includes loading the block of encrypted data into the second trusted execution environment; decrypting the block of encrypted data using the first cryptographic key to yield a corresponding block of decrypted data; processing the block of decrypted data by the data processing module to produce a result; encrypting the result; and at least one of storing the encrypted result in the cloud storage device or providing the encrypted result to the gateway server.

Another example method includes the forgoing operations and further includes generating the first cryptographic key by the RKM server.

Another example method includes the forgoing operations and the first public key is certified by the RKM server.

Another example method includes the forgoing operations and the first trusted execution environment and the second trusted execution environment are the same trusted execution environment.

Another example method includes the forgoing operations and the result is encrypted using a second cryptographic key provided to the data processing module by the key server module.

According to one aspect there is provided a system. The system may include a cloud server comprising a first trusted execution environment, the cloud server one of a plurality of cloud servers configured to perform data processing operations for a plurality of clients; a cloud storage device coupled to the cloud server; a root key management ("RKM") server comprising a key server module, the RKM server configured to sign the key server module using a first private key; and a gateway server configured to provide the signed key server module to the cloud server, the first trusted execution environment configured to verify the key server module using a first public key related to the first private key and to launch the key server module if the key server module verifies, the key server module configured to establish a first secure communication channel between the gateway server and the key server module, and the gateway server configured to provide a first cryptographic key to the key server module via the first secure communication channel.

Another example system includes the forgoing components and the cloud server comprises a second trusted execution environment, the RKM server is configured to sign a data processing module using a second private key, and the gateway server is configured to provide the signed data processing module and a plurality of blocks of encrypted data to the cloud server, the plurality of blocks of encrypted data including the block of encrypted data, the cloud server is configured to store the plurality of blocks of encrypted data in the cloud storage device, and the second trusted execution environment is configured to launch the data processing module and to verify the data processing module using a second public key related to the second private key.

Another example system includes the forgoing components and the key server module is configured to establish a second secure communication channel between the data processing module and the key server module and to provide the first cryptographic key to the data processing module via the second secure communication channel if the data processing module verifies.

Another example system includes the forgoing components and the data processing module is configured to: load the block of encrypted data into the second trusted execution environment, decrypt the block of encrypted data using the first cryptographic key to yield a corresponding block of decrypted data, process the block of decrypted data to produce a result, encrypt the result, and at least one of store the encrypted result in the cloud storage device or provide the encrypted result to the gateway server.

Another example system includes the forgoing components and the RKM server is configured to generate the first cryptographic key.

Another example system includes the forgoing components and the first public key is certified by the RKM server.

According to another aspect there is provided a method. The method may include providing a key server module from a root key management ("RKM") server to a cloud server of a plurality of cloud servers configured to perform data processing operations for a plurality of clients, the cloud server coupled to a cloud storage device, the key server module signed using a first private key; verifying the key server module using a first public key related to the first private key; launching the key server module in a first trusted execution environment in the cloud server if the key server module verifies; establishing a first secure communication channel between a gateway server and the key server module; and providing a first cryptographic key from the gateway server to the key server module via the first secure communication channel, the first cryptographic key configured to decrypt a block of encrypted data.

Another example method includes the forgoing operations and further includes providing a plurality of blocks of encrypted data from the gateway server to the cloud server, the plurality of blocks of encrypted data including the block of encrypted data; storing the plurality of blocks of encrypted data in the cloud storage device; providing a data processing module from the gateway server to the cloud server, the data processing module signed using a second private key; launching the data processing module in a second trusted execution environment in the cloud server; and verifying the data processing module using a second public key related to the second private key.

Another example method includes the forgoing operations and further includes establishing a second secure communication channel between the data processing module and the key server module if the data processing module verifies; and providing the first cryptographic key from the key server module to the data processing module via the second secure communication channel.

Another example method includes the forgoing operations and further includes loading the block of encrypted data into the second trusted execution environment; decrypting the block of encrypted data using the first cryptographic key to yield a corresponding block of decrypted data; processing the block of decrypted data by the data processing module to produce a result; encrypting the result; and at least one of storing the encrypted result in the cloud storage device or providing the encrypted result to the gateway server.

Another example method includes the forgoing operations and further includes generating the first cryptographic key by the RKM server.

Another example method includes the forgoing operations and the first public key is certified by the RKM server.

Another example method includes the forgoing operations and the result is encrypted using a second cryptographic key provided to the data processing module by the key server module.

According to another aspect there is provided a system. The system may include one or more storage mediums having stored thereon, individually or in combination, instructions that when executed by one or more processors result in the following operations including: providing a key server module from a root key management ("RKM") server to a cloud server of a plurality of cloud servers configured to perform data processing operations for a plurality of clients, the cloud server coupled to a cloud storage device, the key server module signed using a first private key; verifying the key server module using a first public key related to the first private key; launching the key server module in a first trusted execution environment in the cloud server if the key server module verifies; establishing a first secure communication channel between a gateway server and the key server module; and providing a first cryptographic key from the gateway server to the key server module via the first secure communication channel, the first cryptographic key configured to decrypt a block of encrypted data.

Another example system includes instructions that when executed by one or more processors result in the forgoing operations and further includes providing a plurality of blocks of encrypted data from the gateway server to the cloud server, the plurality of blocks of encrypted data including the block of encrypted data; storing the plurality of blocks of encrypted data in the cloud storage device; providing a data processing module from the gateway server to the cloud server, the data processing module signed using a second private key; launching the data processing module in a second trusted execution environment in the cloud server; and verifying the data processing module using a second public key related to the second private key.

Another example system includes instructions that when executed by one or more processors result in the forgoing operations and further includes establishing a second secure communication channel between the data processing module and the key server module if the data processing module verifies; and providing the first cryptographic key from the key server module to the data processing module via the second secure communication channel.

Another example system includes instructions that when executed by one or more processors result in the forgoing operations and further includes loading the block of encrypted data into the second trusted execution environment; decrypting the block of encrypted data using the first cryptographic key to yield a corresponding block of decrypted data; processing the block of decrypted data by the data processing module to produce a result; encrypting the result; and at least one of storing the encrypted result in the cloud storage device or providing the encrypted result to the gateway server.

Another example system includes instructions that when executed by one or more processors result in the forgoing operations and further includes generating the first cryptographic key by the RKM server.

Another example system includes instructions that when executed by one or more processors result in the forgoing operations and further includes that the first public key is certified by the RKM server.

Another example system includes instructions that when executed by one or more processors result in the forgoing operations and further includes that the result is encrypted using a second cryptographic key provided to the data processing module by the key server module.

According to one aspect there is provided a system. The system may include a cloud server comprising a first trusted execution environment, the cloud server one of a plurality of cloud servers configured to perform data processing operations for a plurality of clients; a cloud storage device coupled to the cloud server; a root key management ("RKM") server comprising a key server module, the RKM server configured to sign the key server module using a first private key; and a gateway server configured to provide the signed key server module to the cloud server, the first trusted execution environment configured to verify the key server module using a first public key related to the first private key and to launch the key server module if the key server module verifies, the key server module configured to establish a first secure communication channel between the gateway server and the key server module, and the gateway server configured to provide a first cryptographic key to the key server module via the first secure communication channel.

Another example system includes the forgoing components and the cloud server comprises a second trusted execution environment, the RKM server is configured to sign a data processing module using a second private key, and the gateway server is configured to provide the signed data processing module and a plurality of blocks of encrypted data to the cloud server, the plurality of blocks of encrypted data including the block of encrypted data, the cloud server is configured to store the plurality of blocks of encrypted data in the cloud storage device, and the second trusted execution environment is configured to launch the data processing module and to verify the data processing module using a second public key related to the second private key.

Another example system includes the forgoing components and the key server module is configured to establish a second secure communication channel between the data processing module and the key server module and to provide the first cryptographic key to the data processing module via the second secure communication channel if the data processing module verifies.

Another example system includes the forgoing components and the data processing module is configured to: load the block of encrypted data into the second trusted execution environment, decrypt the block of encrypted data using the first cryptographic key to yield a corresponding block of decrypted data, process the block of decrypted data to produce a result, encrypt the result, and at least one of store the encrypted result in the cloud storage device or provide the encrypted result to the gateway server.

Another example system includes the forgoing components and the RKM server is configured to generate the first cryptographic key.

Another example system includes the forgoing components and the first public key is certified by the RKM server.

According to another aspect there is provided a method. The method may include providing a key server module from a root key management ("RKM") server to a cloud server of a plurality of cloud servers configured to perform data processing operations for a plurality of clients, the cloud server coupled to a cloud storage device, the key server module signed using a first private key; verifying the key server module using a first public key related to the first private key; launching the key server module in a first trusted execution environment in the cloud server if the key server module verifies; establishing a first secure communication channel between a gateway server and the key server module; and providing a first cryptographic key from the gateway server to the key server module via the first secure communication channel, the first cryptographic key configured to decrypt a block of encrypted data.

Another example method includes the forgoing operations and further includes providing a plurality of blocks of encrypted data from the gateway server to the cloud server, the plurality of blocks of encrypted data including the block of encrypted data; storing the plurality of blocks of encrypted data in the cloud storage device; providing a data processing module from the gateway server to the cloud server, the data processing module signed using a second private key; launching the data processing module in a second trusted execution environment in the cloud server; and verifying the data processing module using a second public key related to the second private key.

Another example method includes the forgoing operations and further includes establishing a second secure communication channel between the data processing module and the key server module if the data processing module verifies; and providing the first cryptographic key from the key server module to the data processing module via the second secure communication channel.

Another example method includes the forgoing operations and further includes loading the block of encrypted data into the second trusted execution environment; decrypting the block of encrypted data using the first cryptographic key to yield a corresponding block of decrypted data; processing the block of decrypted data by the data processing module to produce a result; encrypting the result; and at least one of storing the encrypted result in the cloud storage device or providing the encrypted result to the gateway server.

Another example method includes the forgoing operations and further includes generating the first cryptographic key by the RKM server.

Another example method includes the forgoing operations and the first public key is certified by the RKM server.

Another example method includes the forgoing operations and the result is encrypted using a second cryptographic key provided to the data processing module by the key server module.

According to one aspect there is provided a system. The system may include means for providing a key server module from a root key management ("RKM") server to a cloud server of a plurality of cloud servers configured to perform data processing operations for a plurality of clients, the cloud server coupled to a cloud storage device, the key server module signed using a first private key; means for verifying the key server module using a first public key related to the first private key; means for launching the key server module in a first trusted execution environment in the cloud server if the key server module verifies; means for establishing a first secure communication channel between a gateway server and the key server module; and means for providing a first cryptographic key from the gateway server to the key server module via the first secure communication channel, the first cryptographic key configured to decrypt a block of encrypted data.

Another example system includes the forgoing components and further includes the means for providing a plurality of blocks of encrypted data from the gateway server to the cloud server, the plurality of blocks of encrypted data including the block of encrypted data; means for storing the plurality of blocks of encrypted data in the cloud storage device; means for providing a data processing module from the gateway server to the cloud server, the data processing module signed using a second private key; means for launching the data processing module in a second trusted execution environment in the cloud server; and means for verifying the data processing module using a second public key related to the second private key.

Another example system includes the forgoing components and further includes the means for establishing a second secure communication channel between the data processing module and the key server module if the data processing module verifies; and means for providing the first cryptographic key from the key server.

Another example system includes the forgoing components and further includes the means for loading the block of encrypted data into the second trusted execution environment; means for decrypting the block of encrypted data using the first cryptographic key to yield a corresponding block of decrypted data; means for processing the block of decrypted data by the data processing module to produce a result; means for encrypting the result; and means for at least one of storing the encrypted result in the cloud storage device or providing the encrypted result to the gateway server.

Another example system includes the forgoing components and further includes the means for generating the first cryptographic key by the RKM server.

Another example system includes the forgoing components and the first public key is certified by the RKM server.

Another example system includes the forgoing components and the result is encrypted using a second cryptographic key provided to the data processing module by the key server module.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system comprising:
   a cloud server comprising a first trusted execution environment, the cloud server one of a plurality of cloud servers configured to perform data processing operations for a plurality of clients;
   a cloud storage device coupled to the cloud server;
   a root key management ("RKM") server comprising a key server module, the RKM server configured to sign the key server module using a first private key; and
   a gateway server configured to provide the signed key server module to the cloud server,
   the first trusted execution environment configured to verify the key server module using a first public key related to the first private key and to launch the key server module if the key server module verifies, the key server module configured to establish a first secure communication channel between the gateway server and the key server module, and the gateway server configured to provide a first cryptographic key to the key server module via the first secure communication channel.

2. The system of claim 1, wherein
   the cloud server comprises a second trusted execution environment,
   the RKM server is configured to sign a data processing module using a second private key, and
   the gateway server is configured to provide the signed data processing module and a plurality of blocks of encrypted data to the cloud server, the plurality of blocks of encrypted data including the block of encrypted data,
   the cloud server is configured to store the plurality of blocks of encrypted data in the cloud storage device, and
   the second trusted execution environment is configured to launch the data processing module and to verify the data processing module using a second public key related to the second private key.

3. The system of claim 2, wherein the key server module is configured to establish a second secure communication channel between the data processing module and the key server module and to provide the first cryptographic key to the data processing module via the second secure communication channel if the data processing module verifies.

4. The system of claim 3, wherein the data processing module is configured to: load the block of encrypted data into the second trusted execution environment, decrypt the block of encrypted data using the first cryptographic key to yield a corresponding block of decrypted data, process the block of decrypted data to produce a result, encrypt the result, and at least one of store the encrypted result in the cloud storage device or provide the encrypted result to the gateway server.

5. The system of claim 1, wherein the RKM server is configured to generate the first cryptographic key.

6. The system of claim 1, wherein the first public key is certified by the RKM server.

7. A method comprising:
providing a key server module from a root key management ("RKM") server to a cloud server of a plurality of cloud servers configured to perform data processing operations for a plurality of clients, the cloud server coupled to a cloud storage device, the key server module signed using a first private key;
verifying the key server module using a first public key related to the first private key;
launching the key server module in a first trusted execution environment in the cloud server if the key server module verifies;
establishing a first secure communication channel between a gateway server and the key server module; and
providing a first cryptographic key from the gateway server to the key server module via the first secure communication channel, the first cryptographic key configured to decrypt a block of encrypted data.

8. The method of claim 7, further comprising:
providing a plurality of blocks of encrypted data from the gateway server to the cloud server, the plurality of blocks of encrypted data including the block of encrypted data;
storing the plurality of blocks of encrypted data in the cloud storage device;
providing a data processing module from the gateway server to the cloud server, the data processing module signed using a second private key;
launching the data processing module in a second trusted execution environment in the cloud server; and
verifying the data processing module using a second public key related to the second private key.

9. The method of claim 7, further comprising:
establishing a second secure communication channel between the data processing module and the key server module if the data processing module verifies; and
providing the first cryptographic key from the key server module to the data processing module via the second secure communication channel.

10. The method of claim 9, further comprising:
loading the block of encrypted data into the second trusted execution environment;
decrypting the block of encrypted data using the first cryptographic key to yield a corresponding block of decrypted data;
processing the block of decrypted data by the data processing module to produce a result;
encrypting the result; and
at least one of storing the encrypted result in the cloud storage device or providing the encrypted result to the gateway server.

11. The method of claim 7, further comprising:
generating the first cryptographic key by the RKM server.

12. The method of claim 7, wherein the first public key is certified by the RKM server.

13. The method of claim 10, wherein the result is encrypted using a second cryptographic key provided to the data processing module by the key server module.

14. A system comprising one or more storage mediums having stored thereon, individually or in combination, instructions that when executed by one or more processors result in the following operations comprising:
providing a key server module from a root key management ("RKM") server to a cloud server of a plurality of cloud servers configured to perform data processing operations for a plurality of clients, the cloud server coupled to a cloud storage device, the key server module signed using a first private key;
verifying the key server module using a first public key related to the first private key;
launching the key server module in a first trusted execution environment in the cloud server if the key server module verifies;
establishing a first secure communication channel between a gateway server and the key server module; and
providing a first cryptographic key from the gateway server to the key server module via the first secure communication channel, the first cryptographic key configured to decrypt a block of encrypted data.

15. The system of claim 14, wherein the instructions that when executed by one or more processors result in the following additional operations comprising:
providing a plurality of blocks of encrypted data from the gateway server to the cloud server, the plurality of blocks of encrypted data including the block of encrypted data;
storing the plurality of blocks of encrypted data in the cloud storage device;
providing a data processing module from the gateway server to the cloud server, the data processing module signed using a second private key;
launching the data processing module in a second trusted execution environment in the cloud server; and
verifying the data processing module using a second public key related to the second private key.

16. The system of claim 14, wherein the instructions that when executed by one or more processors result in the following additional operations comprising:
establishing a second secure communication channel between the data processing module and the key server module if the data processing module verifies; and
providing the first cryptographic key from the key server module to the data processing module via the second secure communication channel.

17. The system of claim 16, wherein the instructions that when executed by one or more processors result in the following additional operations comprising:
loading the block of encrypted data into the second trusted execution environment;
decrypting the block of encrypted data using the first cryptographic key to yield a corresponding block of decrypted data;
processing the block of decrypted data by the data processing module to produce a result;
encrypting the result; and
at least one of storing the encrypted result in the cloud storage device or providing the encrypted result to the gateway server.

18. The system of claim 14, wherein the instructions that when executed by one or more processors result in the following additional operations comprising:
generating the first cryptographic key by the RKM server.

19. The system of claim 14, wherein the first public key is certified by the RKM server.

20. The system of claim 17, wherein the result is encrypted using a second cryptographic key provided to the data processing module by the key server module.

* * * * *